US012791891B2

(12) United States Patent
Kim et al.

(10) Patent No.: US 12,791,891 B2

(45) Date of Patent: Nov. 10, 2026

(54) LIQUID CRYSTAL DISPLAY DEVICE AND TOUCH DISPLAY DEVICE

(71) Applicant: LG Display Co., Ltd., Seoul (KR)

(72) Inventors: ChangEun Kim, Seoul (KR); Jinuk Lee, Seoul (KR); SuJeong Lee, Seoul (KR); JoongHa Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/392,723

(22) Filed: Dec. 21, 2023

(65) Prior Publication Data

US 2024/0210748 A1 Jun. 27, 2024

(30) Foreign Application Priority Data

Dec. 27, 2022 (KR) ........................ 10-2022-0185376
Sep. 26, 2023 (KR) ........................ 10*2023-0129779

(51) Int. Cl.

| | |
|---|---|
| ***G02F 1/1333*** | (2006.01) |
| ***B60K 35/22*** | (2024.01) |
| ***G02F 1/1335*** | (2006.01) |
| ***G02F 1/1362*** | (2006.01) |
| ***G02F 1/1368*** | (2006.01) |
| ***G06F 3/041*** | (2006.01) |
| ***G06F 3/044*** | (2006.01) |

(52) U.S. Cl.

CPC .... *G02F 1/13338* (2013.01); *G02F 1/133502* (2013.01); *G02F 1/133512* (2013.01); *G02F 1/133514* (2013.01); *G02F 1/136227* (2013.01); *G02F 1/1368* (2013.01); *G06F 3/0412* (2013.01); *B60K 35/22* (2024.01); *B60K 2360/1438* (2024.01); *B60K 2360/25* (2024.01); *G02F 2202/22* (2013.01); *G06F 3/044* (2013.01)

(58) Field of Classification Search

CPC ........... G02F 1/13338; G02F 1/133502; G02F 1/133512; G02F 1/133514; G02F 1/136227; G02F 1/1368

See application file for complete search history.

(56) References Cited

U.S. PATENT DOCUMENTS 11,181,790 B2 * 11/2021 Kim ...................... G02F 1/1368
2003/0058395 A1 * 3/2003 Hagiwara ............. G02F 1/1345 349/139

(Continued)

FOREIGN PATENT DOCUMENTS

CN 103676266 A 3/2014
CN 203616558 U 5/2014

(Continued)

OTHER PUBLICATIONS

Espacenet english machine translation of KR20150122852A (Year: 2015).*

*Primary Examiner* — David Y Chung
(74) *Attorney, Agent, or Firm* — Fenwick & West LLP

(57) ABSTRACT

Provided is a liquid crystal display device. The liquid crystal display device includes a first substrate including a plurality of thin film transistors; a second substrate that overlaps the first substrate and includes a black matrix and a color filter; a touch electrode on the first substrate or second substrate; and an antistatic layer on the first substrate. The antistatic layer comprises $In_2O_3$, $SnO_2$, and $SiO_2$.

9 Claims, 12 Drawing Sheets

(56) References Cited

U.S. PATENT DOCUMENTS

| | | | | |
|---|---|---|---|---|
| 2014/0078447 | A1* | 3/2014 | Drolet | G02F 1/136204 349/96 |
| 2014/0293156 | A1* | 10/2014 | Kim | G02F 1/13338 349/12 |
| 2020/0271984 | A1* | 8/2020 | Kudo | G02F 1/133512 |
| 2020/0379308 | A1* | 12/2020 | Yang | G02F 1/155 |
| 2021/0141276 | A1* | 5/2021 | Kim | G02F 1/13394 |

FOREIGN PATENT DOCUMENTS

| | | | | |
|---|---|---|---|---|
| CN | 104073161 | A | 10/2014 | |
| CN | 110322800 | A | 10/2019 | |
| CN | 112782883 | A | 5/2021 | |
| KR | 10-2014-0096635 | A | 8/2014 | |
| KR | 20150122852 | A * | 11/2015 | G02F 1/134363 |
| KR | 10-2021-0056669 | A | 5/2021 | |

* cited by examiner

LIQUID CRYSTAL DISPLAY DEVICE AND TOUCH DISPLAY DEVICE

CROSS-REFERENCE TO RELATED APPLICATIONS

This application claims the benefit of and priority to Republic of Korea Patent Application No. 10-2022-0185376 filed on Dec. 27, 2022 and Republic of Korea Patent Application No. 10-2023-0129779 filed on Sep. 26, 2023, in the Republic of Korea, each of which is hereby incorporated by reference in its entirety.

BACKGROUND

Technical Field

The present disclosure relates to a liquid crystal display device and a touch display device, and more specifically, to an in-cell touch type liquid crystal display device allowing for a reduction in manufacturing costs while securing sheet resistance.

Discussion of the Related Art

Recently, as our society advances toward an information-oriented society, the field of display devices for visually expressing an electrical information signal has rapidly advanced. Various display devices having excellent performance in terms of thinness, lightness, and low power consumption, are being developed correspondingly. Specific examples of such display devices may include a liquid crystal display (LCD) device, a plasma display panel (PDP) device, a field emission display (FED) device, an organic light emitting display (OLED) device, and the like.

Among the display devices, the liquid crystal display device is a device, in which a liquid crystal panel is configured by disposing two substrates, each having electrodes for generating an electric field, so as to face each other and injecting a liquid crystal material between the two substrates, and optical anisotropy and birefringent properties of liquid crystal molecules are controlled by an electric field generated by applying a voltage to the two electrodes of the liquid crystal panel, thereby displaying an image.

In order to provide more diverse functions to users, such liquid crystal displays provide functions to recognize a user's touch on a display panel and perform input processing based on the recognized touch.

A display device capable of touch recognition includes a plurality of touch electrodes disposed on or embedded in a display panel, and can detect whether there has been a user's touch on the display panel and touch coordinates by driving these touch electrodes.

SUMMARY

An object to be achieved by the present disclosure is to provide an in-cell touch type liquid crystal display device allowing for a reduction in manufacturing costs while securing sheet resistance.

Another object to be achieved by the present disclosure is to provide a liquid crystal display device included in a vehicle such as a vehicle display.

Objects of the present disclosure are not limited to the above-mentioned objects, and other objects, which are not mentioned above, can be clearly understood by those skilled in the art from the following descriptions.

In one embodiment, a liquid crystal display device comprises: a first substrate; a plurality of thin film transistors on the first substrate; a second substrate that overlaps the first substrate and is spaced apart from the first substrate, the second substrate including a first side and a second side that is opposite the first side; a black matrix and a color filter on the second side of the second substrate; a touch electrode on the first substrate or second substrate; and an antistatic layer on the first side of the second substrate, the antistatic layer comprising $In_2O_3$, $SnO_2$, and $SiO_2$.

In one embodiment, a touch display device comprises: a liquid crystal display panel configured to display an image, the liquid crystal display panel including a touch electrode; and an antistatic layer on an upper surface of the liquid crystal display panel, the antistatic layer comprising $In_2O_3$, $SnO_2$, and $SiO_2$.

Other detailed matters of the exemplary embodiments are included in the detailed description and the drawings.

According to the present disclosure, a liquid crystal display device capable of preventing or at least reducing static electricity and capacitance interference that occurs during touch input can be provided.

According to the present disclosure, it is possible to form an antistatic layer capable of effectively securing a sheet resistance of $1\times10^{6.3}$ to $1\times10^{7.3}$ Ω/sq while having excellent light transmittance and low reflectance so that it can be used in vehicle displays.

According to the present disclosure, reflective visibility can be improved by adjusting reddish colors caused by reflection of external light.

According to the present disclosure, an in-cell touch type liquid crystal display device for vehicles can be provided.

The effects according to the present disclosure are not limited to the contents exemplified above, and more various effects are included in the present specification.

DETAILED DESCRIPTION

Figure 1:
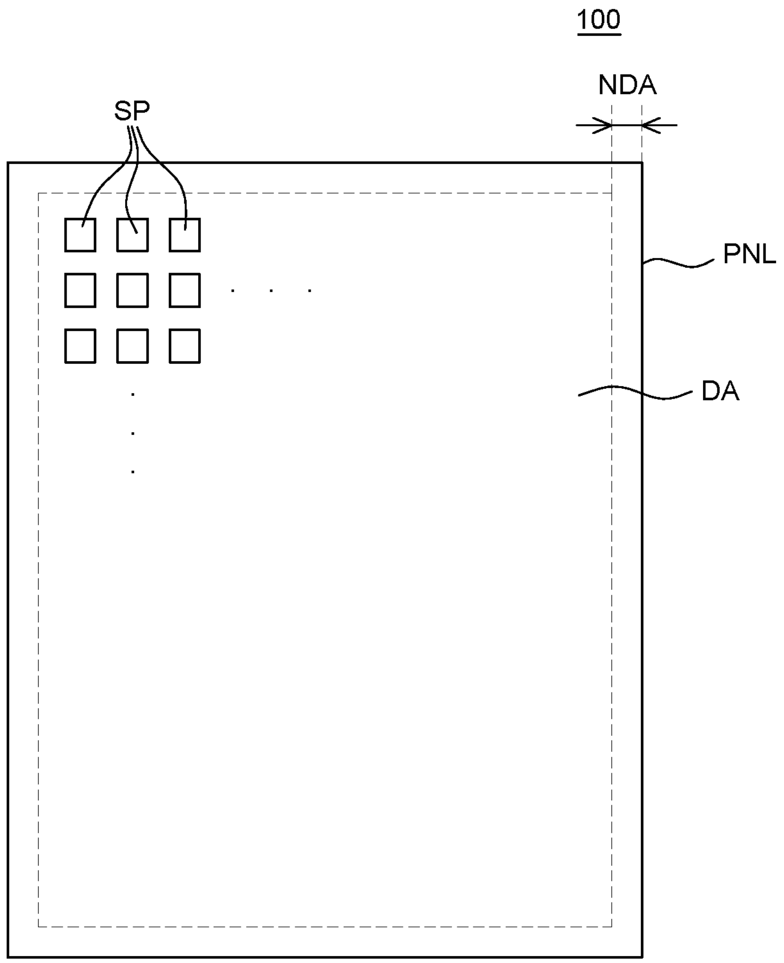
FIG. 1 is a schematic plan view of a liquid crystal display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “comprising” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When an element or layer is disposed “on” another element or layer, another layer or another element may be interposed directly on the other element or therebetween.

Although the terms “first”, “second”, and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a liquid crystal display device according to exemplary embodiments of the present disclosure will be described in detail with reference to accompanying drawings.

Figure 2:
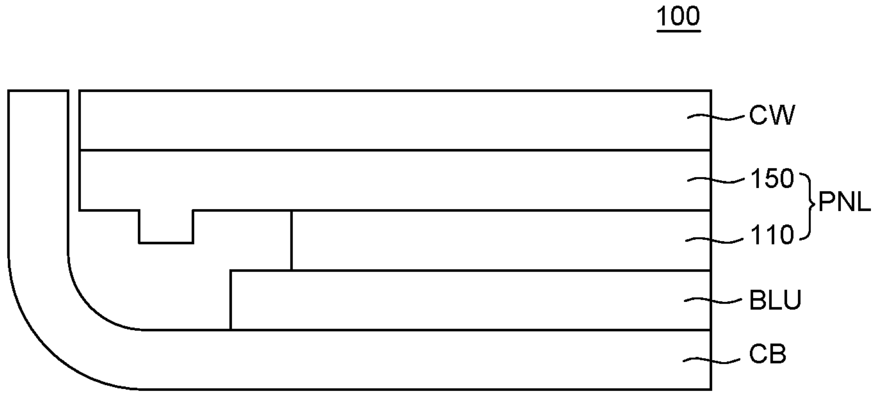
FIG. 2 is a schematic cross-sectional view of the liquid crystal display device according to an exemplary embodiment of the present disclosure.
Figure 3:
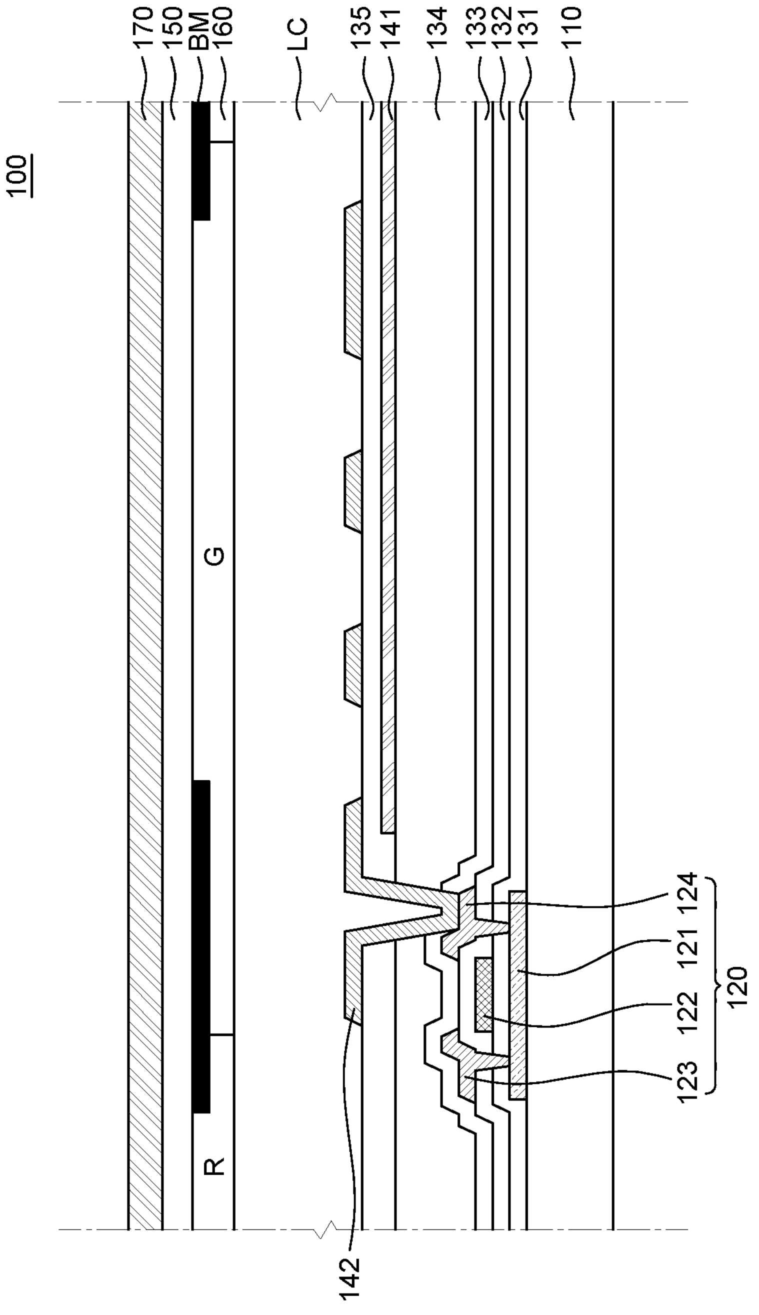
FIG. 3 is a schematic cross-sectional view illustrating a liquid crystal display panel of the liquid crystal display device according to an exemplary embodiment of the present disclosure.

FIGS. 1 to 3 are views for explaining a liquid crystal display device according to an exemplary embodiment of the present disclosure.

FIG. 1 is a schematic plan view of a liquid crystal display device according to an exemplary embodiment of the present disclosure. FIG. 2 is a schematic cross-sectional view of the liquid crystal display device according to an exemplary embodiment of the present disclosure. For convenience of explanation, only a liquid crystal display panel PNL and a plurality of sub-pixels SP among various components of a liquid crystal display device 100 are shown in FIG. 1.

Referring to FIGS. 1 and 2, the liquid crystal display device 100 according to the present disclosure includes the liquid crystal display panel PNL including a first substrate 110 and a second substrate 150, a backlight unit BLU, a cover bottom CB, and a cover window CW.

The liquid crystal display panel PNL outputs images by arranging pixels in a matrix form and is configured to include the first substrate 110 and the second substrate 150 that are bonded with a liquid crystal layer LC interposed therebetween to control light transmittance. A specific structure of the liquid crystal display panel PNL will be described later with reference to FIG. 3.

The liquid crystal display panel PNL includes a display area DA and a non-display area NDA. The display area DA is an area where the plurality of sub-pixels SP are disposed and an image is displayed, and the non-display area NDA is an outer area surrounding the display area DA, where no image is displayed. The non-display area NDA may be referred to as a bezel area. Lines and driving circuits for driving a screen are disposed in the non-display area NDA.

The plurality of sub-pixels SP may be defined in the liquid crystal display panel PNL. The plurality of sub-pixels SP are minimum units constituting the display area DA, and each of the sub-pixels SP is an area for displaying one color. For example, the plurality of sub-pixels SP may be composed of a red sub-pixel, a green sub-pixel, and a blue sub-pixel. The plurality of sub-pixels SP may be defined in a matrix form as shown in FIG. 1.

The backlight unit BLU is disposed below the liquid crystal display panel PNL such that the backlight unit BLU is between the liquid crystal display panel PNL and the cover bottom CB. The backlight unit BLU supplies light to the liquid crystal display panel PNL. The backlight unit BLU may include a light source, a reflective film, a light guide plate, a guide panel, and an optical film. At this time, the backlight unit BLU can be used by selecting either of a cold cathode fluorescence lamp (CCFL), a hot cathode fluorescence lamp (HCFL) or an external electrode fluorescent lamp (EEFL), or a light emitting diode (LED) as a light source, but the present disclosure is not limited thereto.

The cover bottom CB is a case member that accommodates and protects components of the liquid crystal display device 100. The cover bottom CB surrounds side surfaces of the liquid crystal display panel PNL and the backlight unit BLU and may be disposed on a back surface of the backlight unit BLU. Specifically, the cover bottom CB may be formed in a shape of a quadrangular frame with vertically bent edges. For example, the cover bottom CB may include a horizontal portion disposed to face the back surface of the backlight unit BLU and a vertical portion extending from the horizontal portion and disposed to surround the side surfaces of the liquid crystal display panel PNL and the backlight unit BLU.

The cover bottom CB may have a material having high thermal conductivity and high rigidity to smoothly radiate heat from the driving circuit and the light source of the backlight unit BLU to the outside. As an example, the cover bottom CB may be manufactured as a metal plate such as aluminum, aluminum nitride (AlN), electro-galvanized steel (EGI), stainless steel (SUS), galvalume (SGLC), aluminum-plated steel (also known as ALCOSTA), and tin-plated steel (SPTE), but the present disclosure is not limited thereto.

The cover window CW is on an upper surface of the liquid crystal display panel and protects the liquid crystal display panel PNL from external impacts and scratches. Accordingly, the cover window CW may be formed of a material that is transparent and has excellent impact resistance and scratch resistance. Additionally, the cover window CW protects the liquid crystal display panel PNL from moisture permeating from the outside. Accordingly, the cover window CW can prevent degradation of display quality due to deterioration of the liquid crystal display panel PNL.

The thickness and weight of the liquid crystal display device 100 is reduced by using a plastic-based cover window CW. For example, the cover window CW may be a film formed of a polymer such as polyimide, polyamide imide, polyethylene terephthalate, polymethyl methacrylate, polypropylene glycol, or polycarbonate. Alternatively, the cover window CW may be a film formed of an optically isotropic polymer such as a cyclo-olefin (co)polymer, optically isotropic polycarbonate, or optically isotropic polymethyl methacrylate. Additionally, the cover window CW may have a multilayered structure in which various functional layers are stacked. For example, the cover window CW may include various functional layers such as an external light reflection reduction layer, a UV blocking layer, and a hard coating layer.

Meanwhile, although not shown in FIG. 2, a polarizing plate may be disposed on at least one of a front surface and a back surface of the liquid crystal display panel PNL. For example, the polarizing plate may be disposed on a lower surface of the first substrate 110 or an upper surface of the second substrate 150, but the present disclosure is not limited thereto.

Hereinafter, the liquid crystal display panel PNL of the liquid crystal display device 100 according to an exemplary embodiment of the present disclosure will be described with reference to FIG. 3. FIG. 3 is a schematic cross-sectional view illustrating a liquid crystal display panel of the liquid crystal display device according to an exemplary embodiment of the present disclosure.

For example, the liquid crystal display panel PNL may be driven in a fringe field switching (FFS) method in which a fringe field formed between a first electrode 141 serving as a common electrode and a second electrode 142 serving as a pixel electrode passes through slits and drive liquid crystal molecules of the liquid crystal layer LC located on a pixel area, thereby implementing an image. As another example, the liquid crystal display panel PNL may be driven in an in-plane switching (IPS) method in which the first electrode 141 serving as the common electrode and the second electrode 142 serving as the pixel electrode are disposed in parallel and the liquid crystal molecules of the liquid crystal layer LC are driven by a lateral electric field of the first electrode 141 and the second electrode 142, thereby implementing an image.

Referring to FIG. 3, the liquid crystal display panel PNL includes the first substrate 110 and the second substrate 150 that is spaced apart from the first substrate 110 and overlaps the first substrate 110.

The first substrate 110 is a component to support various components included in the liquid crystal display device 100 and protect the components from external impacts or the external environment, and may be formed of an insulating material. For example, the first substrate 110 may be formed of a glass substrate or a plastic substrate such as polyethylene terephthalate (PET), polyethylene naphthalate (PEN), or polyimide.

The first substrate 110 supports various components of the liquid crystal display device 100. The first substrate 110 may include the display area DA and the non-display area NDA, as in the liquid crystal display panel PNL described above. A thin film transistor 120, various lines, and electrodes are formed on the first substrate 110 to define the plurality of sub-pixels. A color filter 160 for displaying three primary colors of red, green, and blue and a black matrix BM dividing each sub-pixel may be formed on the second substrate 150 (e.g., on a lower surface or second surface).

On the first substrate 110, a plurality of gate lines and data lines are disposed to intersect each other. The thin film transistor 120 may be disposed in an intersection area of the gate line and the data line and connected to the second electrode 142 formed in the display area DA.

A buffer layer may be disposed between the first substrate 110 and the thin film transistor 120. The buffer layer blocks impurities flowing from the first substrate 110 during a process of forming the thin film transistor. Additionally, the buffer layer protects various components of a foldable display device 100 by preventing penetration of moisture ($H_2O$) and hydrogen ($H_2$) from the outside. The buffer layer may be formed of an insulating material. For example, in the buffer layer, an inorganic layer formed of silicon nitride (SiNx), silicon oxide (SiOx), or silicon oxynitride (SiON) may be configured as a single layer or multiple layer.

The thin film transistor 120 may be used as a driving element of the liquid crystal display device 100. The thin film transistor 120 includes an active layer 121, a gate electrode 122, a source electrode 123, and a drain electrode 124. In the liquid crystal display device 100 according to an exemplary embodiment of the present disclosure, the thin film transistor 120 is a thin film transistor 120 having a top gate structure where the gate electrode 122 is disposed over the active layer 121 in such a manner that the gate electrode 122 is disposed on the active layer 121 and the source electrode 123 and the drain electrode 124 are disposed on the gate electrode 122, but the present disclosure is not limited thereto. The thin film transistor 120 may be a thin film transistor having a bottom gate structure in which the active layer is disposed on the gate electrode and the gate electrode is disposed at a lowest position.

Specifically, the active layer 121 is disposed on the first substrate 110. The active layer 121 may be formed of polysilicon (p-Si), amorphous silicon (a-Si), or an oxide semiconductor, but is not limited thereto.

A gate insulating layer 131 is disposed on the first substrate 110 and the active layer 121. The gate insulating layer 131 may be formed of silicon oxide (SiOx), silicon nitride (SiNx), or a multiple layer thereof. The gate electrode

122 is disposed on the gate insulating layer 131. The gate electrode 122 is disposed to overlap the active layer 121 on the gate insulating layer 131.

The gate electrode 122 may be formed of various conductive materials, such as magnesium (Mg), aluminum (Al), nickel (Ni), chromium (Cr), molybdenum (Mo), tungsten (W), gold (Au), or an alloy thereof, but the present disclosure is not limited thereto.

An interlayer insulating layer 132 is disposed on the gate insulating layer 131 and the gate electrode 122. The interlayer insulating layer 132 may be formed of silicon oxide (SiOx), silicon nitride (SiNx), or a multiple layer thereof.

The source electrode 123 and the drain electrode 124 are disposed on the interlayer insulating layer 132. The source electrode 123 and the drain electrode 124 are electrically connected to the active layer 121 through contact holes formed in the gate insulating layer 131 and the interlayer insulating layer 132. The source electrode 123 and the drain electrode 124 may be formed of various conductive materials, such as magnesium (Mg), aluminum (Al), nickel (Ni), chromium (Cr), molybdenum (Mo), tungsten (W), gold (Au) or an alloy thereof, but the present disclosure is not limited thereto.

A passivation layer 133 is disposed on the source electrode 123 and the drain electrode 124. The passivation layer 133 is an insulating layer to protect components below the passivation layer 133. The passivation layer 133 may be composed of a single layer or a multiple layer of silicon oxide (SiOx) or silicon nitride (SiNx), but is not limited thereto.

A planarization layer 134 is disposed on the passivation layer 133. The planarization layer 134 is an insulating layer that planarizes an upper portion of the first substrate 110 on which the thin film transistor 120 is disposed. The planarization layer 134 may be formed of an organic material, for example, may be composed of a single layer or a multiple layer of polyimide or photo acryl, but the present disclosure is not limited thereto. The planarization layer 134 may include a contact hole for electrically connecting the thin film transistor 120 and the second electrode 142.

The first electrode 141, which is a common electrode, is formed on the planarization layer 134. The first electrode 141 is electrically connected to a common line. The first electrode 141 is configured as one large electrode and is commonly used in the sub-pixels SP.

Meanwhile, the liquid crystal display device according to an exemplary embodiment of the present disclosure includes a touch element. In this case, the first electrode 141 may be configured with a plurality of common electrode blocks. The common electrode blocks configured as the first electrode 141 may function as a touch electrode of a capacitive type touch element for touch sensing during a touch sensing mode of the display device and function as a common electrode for displaying an image during a display mode.

The first electrode 141 may be formed of a transparent conductive material. For example, the transparent conductive material may be formed of tin oxide (TO), indium tin oxide (ITO), indium zinc oxide (IZO), indium zinc tin oxide (ITZO) or the like, but is not limited thereto.

A protective layer 135 is disposed on the first electrode 141. The protective layer 135 is a layer for insulating the first electrode 141 and the second electrode 142, and may be formed of an inorganic insulating material or an organic insulating material. For example, the protective layer 135 may be composed of a single layer or a multiple layer of silicon oxide (SiOx) or silicon nitride (SiNx), but is not limited thereto.

The second electrode 142 is disposed on the protective layer 135 such that the second electrode 142 is spaced apart from the first electrode 141 and overlaps (e.g., partially overlaps) the first electrode 141. The second electrode 142 may be a pixel electrode. The second electrode 142 is electrically connected to the drain electrode 124 through contact holes penetrating the protective layer 135, the planarization layer 134, and the passivation layer 133 there below. In FIG. 3, it is illustrated that the second electrode 142 contacts the drain electrode 124 of the thin film transistor 120, but in some embodiments, the second electrode 142 may contact the source electrode 123 of the thin film transistor 120.

The second electrode 142 may be formed in a structure having a plurality of slits. In this case, the second electrode 142 may be formed in a linear shape or may be formed in a zigzag form having at least one or more curved shapes. In the liquid crystal display device 100 shown in FIG. 3, a structure in which the second electrode 142 has a plurality of slits and the first electrode 141 is formed of a single electrode block is illustrated, but the present disclosure is not limited thereto. The liquid crystal display device 100 may be formed in a structure in which the second electrode 142 is formed of a single electrode block and the first electrode 141 has a plurality of slits.

For example, the second electrode 142 may be formed of a transparent conductive material. For example, the transparent conductive material may be formed of tin oxide (TO), indium tin oxide (ITO), indium zinc oxide (IZO), or indium zinc tin oxide (ITZO), but the present disclosure is not limited thereto.

When a voltage is applied to the second electrode 142 through the thin film transistor 120, the liquid crystal molecules of the liquid crystal layer LC rotate by dielectric anisotropy due to electric fields formed in the second electrode 142 and the first electrode 141, and light transmittance of light passing through the display area changes depending on a degree of rotation of liquid crystals. Accordingly, the amount of light of the sub-pixel SP can be controlled.

An antistatic layer 170 is disposed on an upper surface (e.g., a first surface) of the second substrate 150. The antistatic layer 170 radiates static electricity generated during a manufacturing process and an application process of the liquid crystal display device 100 to the outside. Additionally, the antistatic layer 170 prevents or at least reduces interference of capacitance occurring between a user's finger and the touch electrode when the user performs a touch input through an image display surface of the liquid crystal display device 100.

A thickness of the antistatic layer 170 may be in a range of 100 Å to 250 Å. When the thickness of the antistatic layer 170 satisfies the above range, static electricity discharge performance can be improved without degradation in touch performance.

The antistatic layer 170 may have a sheet resistance in a range of $1\times10^{6.3}$ to $1\times10^{7.3}$ Ω/sq to prevent or at least reduce static electricity and capacitance interference. Generally, a sheet resistance in a range of $1\times10^{7}$ to $1\times10^{9}$ Ω/sq, which is high, is used to prevent or at least reduce static electricity, but the liquid crystal display device 100 according to an exemplary embodiment of the present disclosure should satisfy somewhat strict conditions in order to be used in a vehicle such as a vehicle display. In the case of vehicle displays, the video displays are used in locations close to people in vehicles, have a lot of electronic devices nearby, and have a small screen size compared to general home displays. Considering these conditions, the antistatic layer 170 has the above sheet resistance range. When the sheet resistance of the antistatic layer 170 is less than $1\times10^{6.3}$ Ω/sq, the antistatic layer 170 interferes with capacitance formed when a touch is made, thereby degrading touch performance. Additionally, when the sheet resistance of the antistatic layer 170 is greater than $1\times10^{7.3}$ Ω/sq, the generated static electricity may not be discharged to the outside.

In addition, since the antistatic layer 170 is located on an upper layer (e.g., an upper surface) of the liquid crystal display panel PNL, light transmittance is 96.5% or 97.5% or more and reflectance is 11% or 10.5% or less so as not to reduce luminance or display performance.

The antistatic layer 170 is formed from indium(III) oxide ($In_2O_3$), tin(IV) oxide ($SnO_2$), and silicon dioxide ($SiO_2$). In this case, the content of $In_2O_3$ may be in a range of 78 wt. % (weight %) to 85 wt. %, the content of $SnO_2$ may be in a range of 5 wt. % to 10 wt. %, and the content of $SiO_2$ may be in a range of 10 wt. % to 12 wt. %. When the contents of $In_2O_3$, $SnO_2$, and $SiO_2$ satisfy all of the above ranges, the antistatic layer 170 can secure a sheet resistance of $1\times10^{6.3}$ to $1\times10^{7.3}$ Ω/sq and desired light transmittance and reflectance.

In this case, the antistatic layer 170 is formed from the compounds described above, and may include 30 at % (atomic %) to 35 at % of indium (In), 2 at % to 4 at % of tin (Sn), 8 at % to 11 at % of silicon (Si), and 50 at % to 60 at % of oxygen. However, the present disclosure is not limited thereto.

Meanwhile, in a process of depositing $SiO_2$ to form the antistatic layer 170 on the second substrate 150, the sheet resistance of the antistatic layer 170 that is required for the liquid crystal display device 100 according to an exemplary embodiment of the present disclosure can be secured more accurately by adjusting an oxygen partial pressure within a process chamber.

In the liquid crystal display device 100 according to an exemplary embodiment of the present disclosure, the antistatic layer 170 may be formed through a sputtering process. Specifically, the antistatic layer 170 may be formed on an entire surface of the substrate by disposing the second substrate 150 in a sputtering deposition chamber and then, performing sputtering on one surface of the second substrate 150 by room temperature deposition or high temperature deposition.

In this case, the sheet resistance of the antistatic layer 170 can be adjusted according to the amount of oxygen or oxygen partial pressure that is supplied into the sputtering deposition chamber during the sputtering process. For example, $In_2O_3$ is used as a host material, and $SnO_2$ and $SiO_2$ are used as dopant materials. In a process of depositing $SnO_2$ and $SiO_2$, the sheet resistance can be precisely adjusted by controlling the oxygen partial pressure, and the same time, light transmittance and reflectance can be satisfied.

Specifically, the oxygen partial pressure can be adjusted within a composition range of $In_2O_3$, $SnO_2$ and $SiO_2$ described above. In one embodiment, a partial pressure of oxygen supplied in a power range of 6.5 kW to 7.5 kW within the sputtering deposition chamber is adjusted to 4.4% to 5.6% or 4.7% to 5.3%, so that the antistatic layer 170 having a sheet resistance of $1\times10^{6.3}$ to $1\times10^{7.3}$ Ω/sq, a light transmittance of 97.5% or more, and a reflectance of 10.5% or less can be formed.

Hereinafter, effects of the present disclosure according to sputtering deposition conditions will be examined in more detail through experimental data. However, the following experimental examples are intended to illustrate the present disclosure, and the scope of the present disclosure is not limited by the following examples.

Experimental Example 1

Figure 4A:
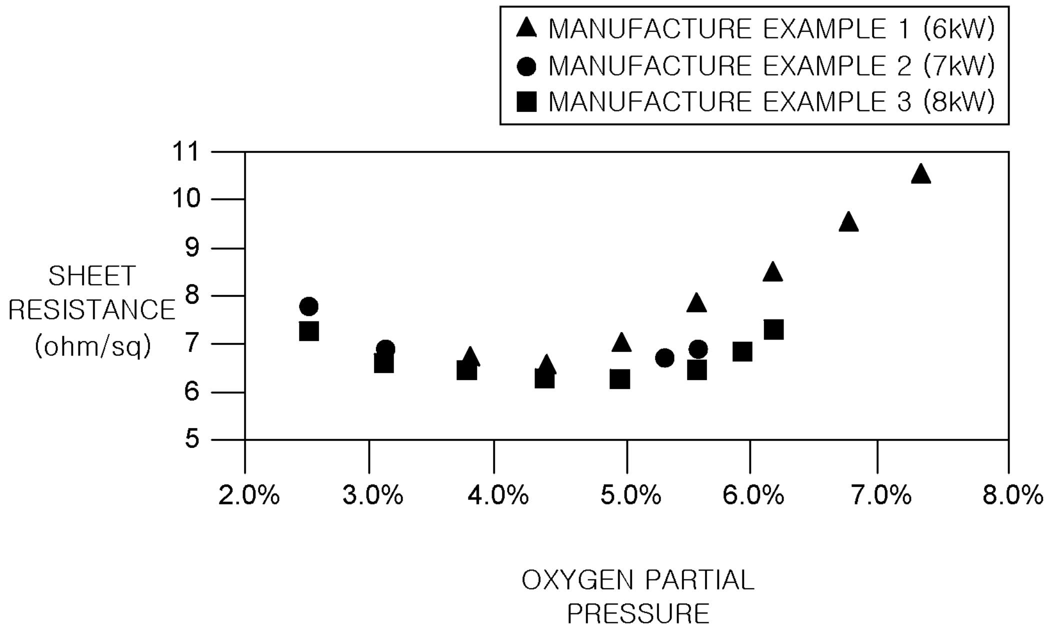
FIG. 4A is a graph showing changes in sheet resistance according to oxygen partial pressures of Manufacture Examples 1 to 3 in which power is varied during a sputtering deposition process.
Figure 4B:
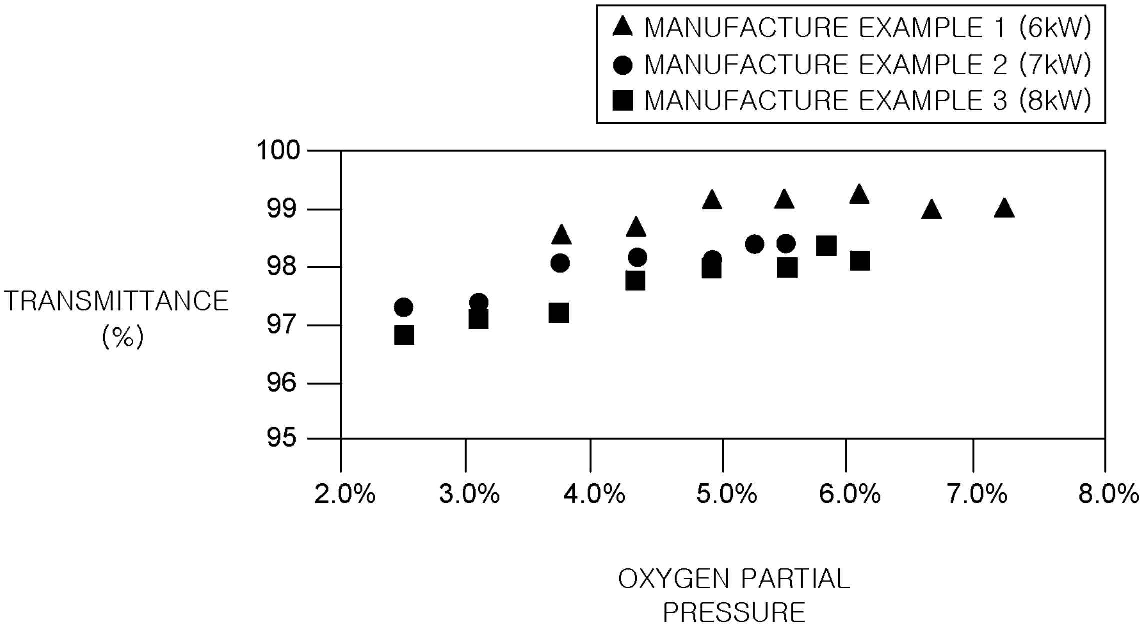
FIG. 4B is a graph showing changes in light transmittance according to oxygen partial pressures of Manufacture Examples 1 to 3 in which power is varied during the sputtering deposition process.
Figure 4C:
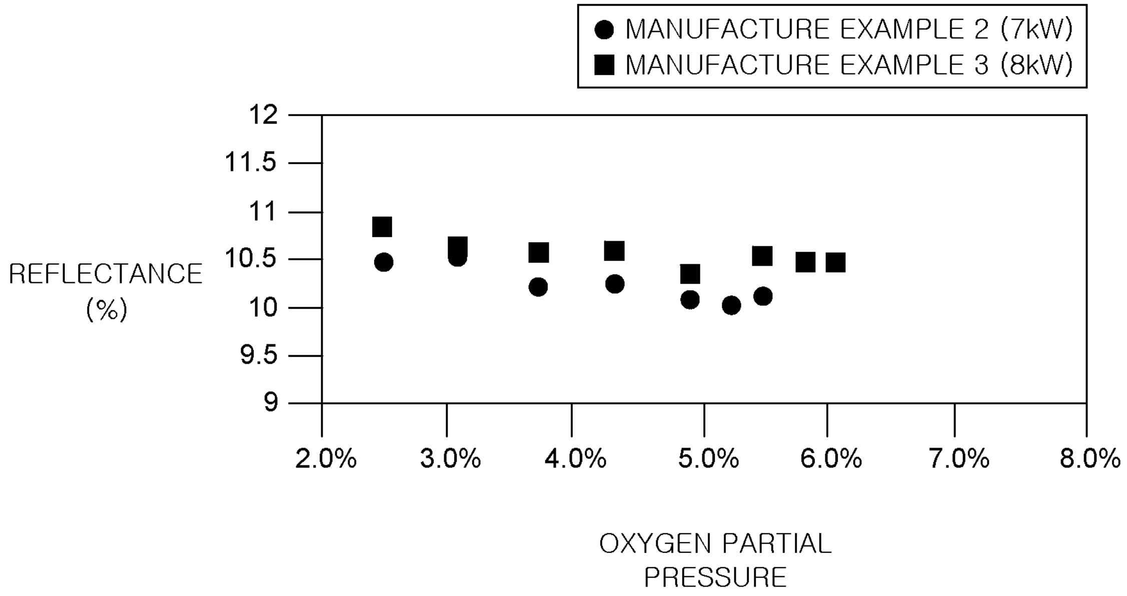
FIG. 4C is a graph showing changes in reflectance according to oxygen partial pressures of Manufacture Examples 1 to 3 in which power is varied during the sputtering deposition process.

In Experimental Example 1, samples in which antistatic layers having a thickness of 200 Å were formed were manufactured using $In_2O_3$, $SnO_2$ and $SiO_2$ through a sputtering process. The contents of $In_2O_3$, $SnO_2$ and $SiO_2$ are 84 wt. %, 5 wt. %, and 11 wt. %, respectively. At this time, while power was changed to 6 kW (Manufacture Example 1), 7 kW (Manufacture Example 2), and 8 kW (Manufacture Example 3), and an oxygen partial pressure for each Manufacture Example is adjusted, sheet resistance, light transmittance, and reflectance were measured. Consequent results are shown in FIGS. 4A to 4C. FIGS. 4A to 4C are graphs showing changes in sheet resistance, light transmittance, and reflectance according to the oxygen partial pressures of Manufacture Examples 1 to 3 with varied power during the sputtering deposition process, respectively.

First, referring to FIG. 4A, it can be confirmed that when the oxygen partial pressure was 4.0% or less or 6.0% or more, the sheet resistance rapidly increased. In addition, referring to FIGS. 4B to 4C, it can be confirmed that when the power was 8 kW during the sputtering process, light transmittance and reflectance characteristics were degraded overall. Accordingly, considering data of FIGS. 4A to 4C overall, it can be confirmed that the power is in the range of 6.5 kW to 7.5 kW and the oxygen partial pressure is in the range of 4.7% to 5.3% so that the sheet resistance and optical characteristics of the antistatic layers formed satisfy the above-mentioned ranges.

In the case of materials for forming conventional antistatic layers, it was difficult to apply them to liquid crystal display devices for vehicles. In the case of general mobile displays, an antistatic layer formed of a transparent high-resistance film of $1\times10^{8}$ Ω/sq or more is used. To this end, it was formed by mixing a conductive polymer such as PEDOT:PSS or a carbonaceous conductive material such as CNT with a silicate-based cross-linkable compound such as TEOS or SSQ. However, it was not possible to form an antistatic layer that satisfies all of the sheet resistance, the light transmittance, and the reflectance that are required by the present disclosure from the above-described materials. In addition, since the conductive polymers such as PEDOT:PSS lack high-temperature reliability, it was difficult to use them in vehicle displays which are exposed to the outside for a long time or in which indoor temperature can rise significantly. In addition, when carbonaceous conductive materials such as CNTs are used, manufacturing costs increase significantly, and process efficiency decreases.

In the liquid crystal display device according to an exemplary embodiment of the present disclosure, the antistatic layer disposed on an upper substrate is formed of $In_2O_3$, $SnO_2$, and $SiO_2$. In this case, the content of $In_2O_3$ is in a range of 78 wt. % to 85 wt. %, the content of $SnO_2$ is in a range of 5 wt. % to 10 wt. %, and the content of $SiO_2$ is in a range of 10 wt. % to 12 wt. %. Through this, it is possible to form an antistatic layer with a sheet resistance in a range of $1\times10^{6.3}$ to $1\times10^{7.3}$ Ω/sq, a light transmittance of 96.5% or more, and a reflectance of 11% or less. By using the antistatic layer having these properties, an in-cell touch type liquid crystal display device for a vehicle can be provided.

Figure 5:
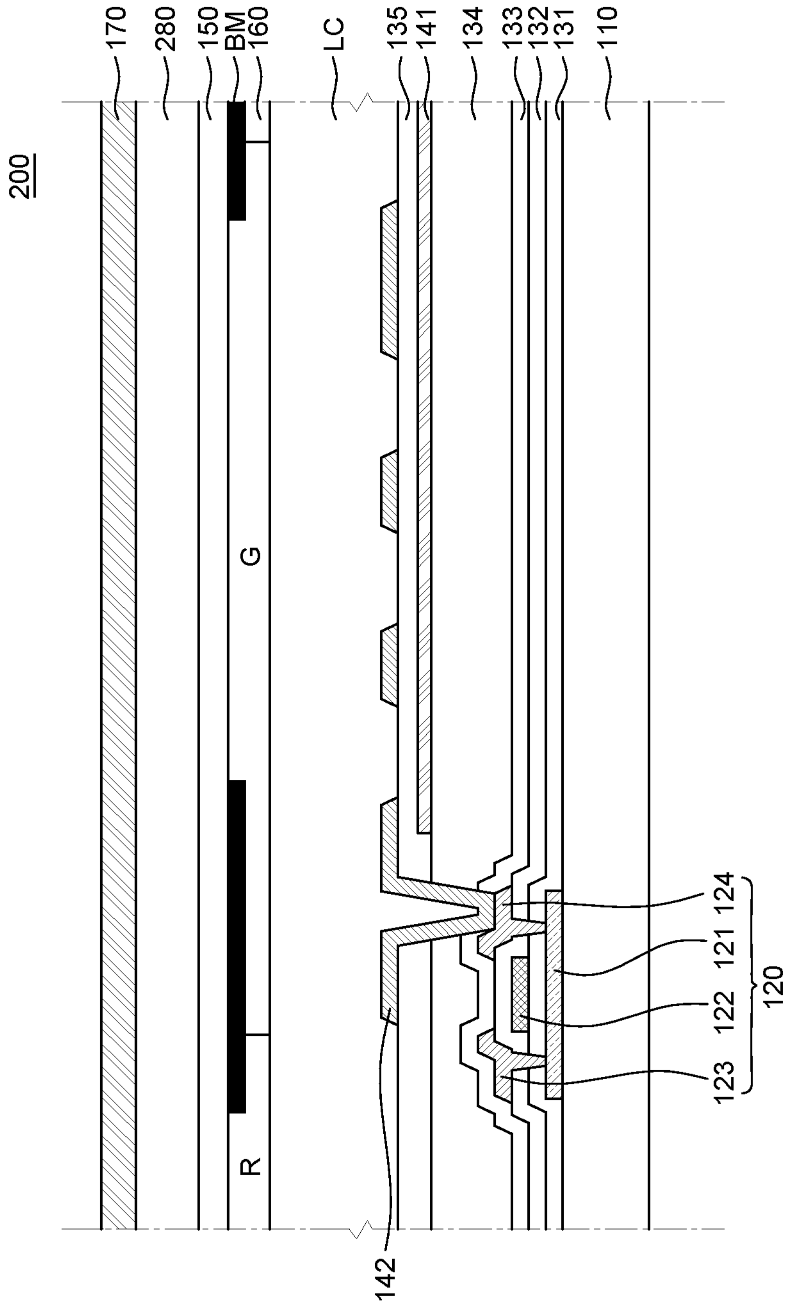
FIG. 5 is a schematic cross-sectional view illustrating a liquid crystal display panel of a liquid crystal display device according to another exemplary embodiment of the present disclosure.

FIG. 5 is a schematic cross-sectional view illustrating a liquid crystal display panel of a liquid crystal display device according to another exemplary embodiment of the present disclosure.

The liquid crystal display panel shown in FIG. 5 is identical to the liquid crystal display panel shown in FIG. 3 except that a refractive index-matching layer 280 is further disposed between the antistatic layer 170 and the second substrate 150. Therefore, redundant descriptions will be omitted.

The refractive index-matching layer 280 is disposed on the second substrate 150 and disposed below the antistatic layer 170.

The refractive index-matching layer 280 can improve light transmittance and further reduce reflectance while maintaining a sheet resistance value in a liquid crystal display panel 200 including the antistatic layer 170, thereby allowing for improvements in display panel performance and external visibility. The refractive index-matching layer 280 can improve reflective visibility from the outside of the panel by lowering a difference in refractive index between the second substrate 150 and the antistatic layer 170 formed of $In_2O_3$, $SnO_2$, and $SiO_2$. Thus, the refractive index-matching layer 280 matches the refractive index of the antistatic layer 170 and refractive index of the second substrate 150 in one embodiment.

In addition, since color coordinates of the liquid crystal display panel are shifted toward blueish colors through the refractive index-matching layer 280, there are effects of improving reflective visibility and impression of colors. Specifically, a conventional liquid crystal display panel exhibits a reddish color due to high reflectance of the conductive layer, and the reflective visibility can be improved by adjusting color coordinate values through the refractive index-matching layer 280.

The refractive index-matching layer 280 may include $SiO_2$. Specifically, the refractive index-matching layer 280 may be formed of a $SiO_2$ single layer.

The refractive index-matching layer 280 may be formed through a deposition process. For example, the refractive index-matching layer 280 may be formed by a sputtering process. Specifically, the refractive index-matching layer 280 can be formed on an entire surface of the second substrate 150 by disposing the second substrate 150 in the sputtering deposition chamber and then performing sputtering on one surface of the second substrate 150 by room temperature deposition or high temperature deposition. At this time, in the process of depositing $SiO_2$ to form the refractive index-matching layer 280 on the second substrate 150, the light transmittance and external light reflectance of the liquid crystal display panel can be adjusted by adjusting the oxygen partial pressure within the process chamber.

Meanwhile, the refractive index-matching layer 280 may be formed through a deposition process prior to forming of the antistatic layer 170, and the antistatic layer 170 may be formed on the refractive index-matching layer 280 through a later deposition process.

The thickness of the refractive index-matching layer 280 may be in a range of 100 Å to 900 Å in one embodiment. When the thickness of the refractive index-matching layer 280 satisfies the above range, external light reflectance can be reduced and light transmittance can be improved.

Figure 6:
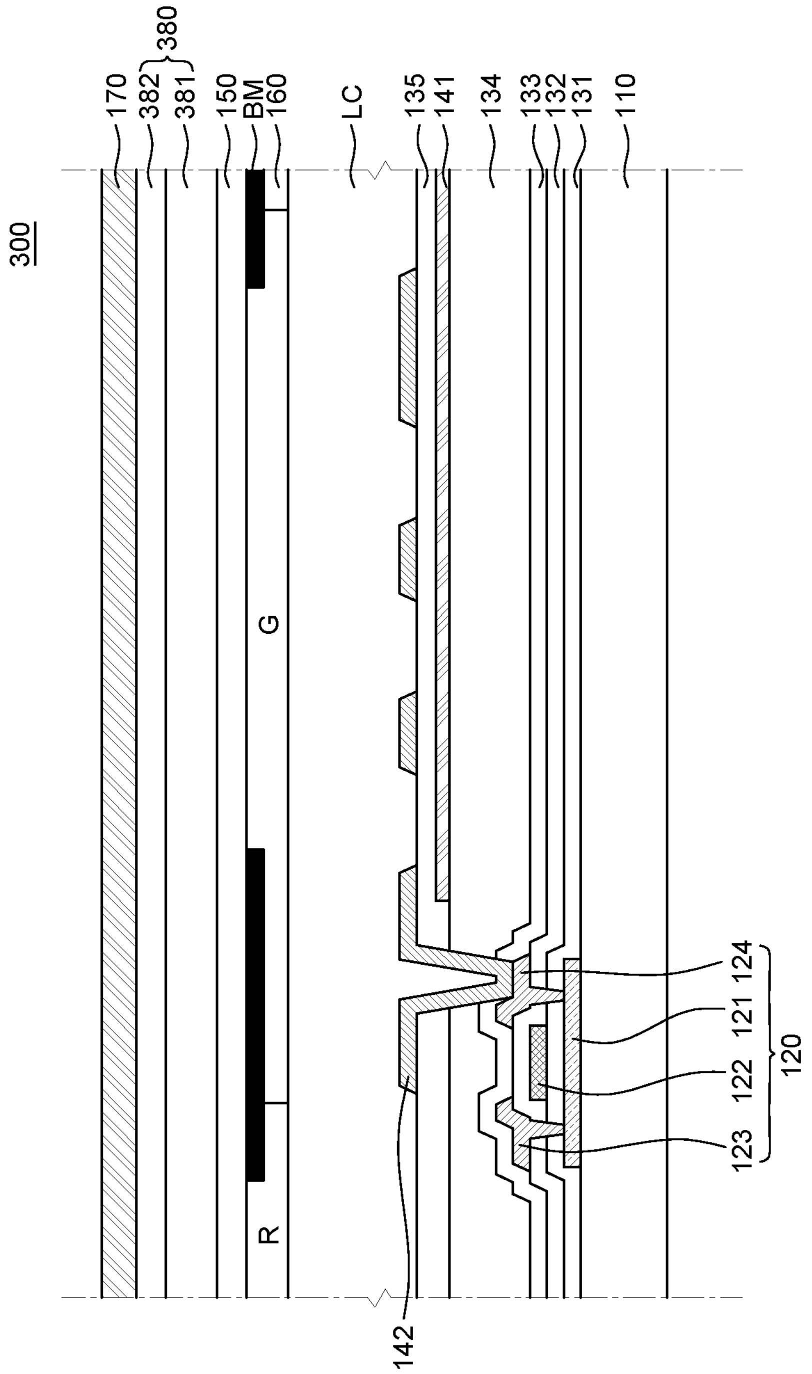
FIG. 6 is a schematic cross-sectional view illustrating a liquid crystal display panel of a liquid crystal display device according to still another exemplary embodiment of the present disclosure.

FIG. 6 is a schematic cross-sectional view illustrating a liquid crystal display panel of a liquid crystal display device according to still another exemplary embodiment of the present disclosure.

The liquid crystal display panel shown in FIG. 6 is identical to the liquid crystal display panel shown in FIG. 5 except that a refractive index-matching layer 380 is composed of a plurality of layers. Therefore, redundant descriptions will be omitted.

The refractive index-matching layer 380 is disposed between the antistatic layer 170 and the second substrate 150. In this case, the refractive index-matching layer 380 includes a first refractive index-matching layer 381 disposed on the second substrate 150 and a second refractive index-matching layer 382 disposed on the first refractive index-matching layer 381. Thus, the second refractive index-matching layer 382 is between the first refractive index-matching layer 381 and the antistatic layer 170.

First, the first refractive index-matching layer 381 disposed below the second refractive index-matching layer 382 may include $SiO_2$. Specifically, the first refractive index-matching layer 381 may be formed as a single layer of $SiO_2$. In this case, a thickness of the first refractive index-matching layer 381 may be in a range of 600 Å to 900 Å.

Next, the second refractive index-matching layer 382 may include niobium oxide $Nb_2O_5$. Specifically, the second refractive index-matching layer 382 may be formed of a single layer of $Nb_2O_5$. In this case, a thickness of the second refractive index-matching layer 382 may be in a range of 100 Å to 200 Å. Thus, the thickness of the first refractive index-matching layer 381 is greater than the thickness of the second refractive index-matching layer 382.

When the thicknesses of the first refractive index-matching layer 381 and the second refractive index-matching layer 382 respectively satisfy the above ranges, external light reflectance can be further reduced and light transmittance can be improved.

The first refractive index-matching layer 381 and the second refractive index-matching layer 382 may each be formed through a deposition process. That is, the first refractive index-matching layer 381 may be formed on the entire surface of the second substrate 150 by disposing the second substrate 150 in a sputtering deposition chamber and then, performing sputtering on one surface of the second substrate 150 by room temperature deposition or high temperature deposition. The second refractive index-matching layer 382 may be formed on the first refractive index-matching layer 381 by disposing the second substrate 150 on which the first refractive index-matching layer 381 is formed in the deposition chamber again. Since the contents related to the deposition process are substantially identical to those of the refractive index-matching layer 280 described in FIG. 5, duplicate descriptions will be omitted.

The liquid crystal display panel shown in FIG. 6 has the first refractive index-matching layer 381 formed of $SiO_2$ and the second refractive index-matching layer 382 formed of $Nb_2O_5$ between the second substrate 150 and the antistatic layer 170. Thus, while maintaining a sheet resistance value in the liquid crystal display panel including the antistatic layer 170, light transmittance can be improved and reflectance can be further reduced, thereby improving display panel performance and external visibility.

Figure 8:
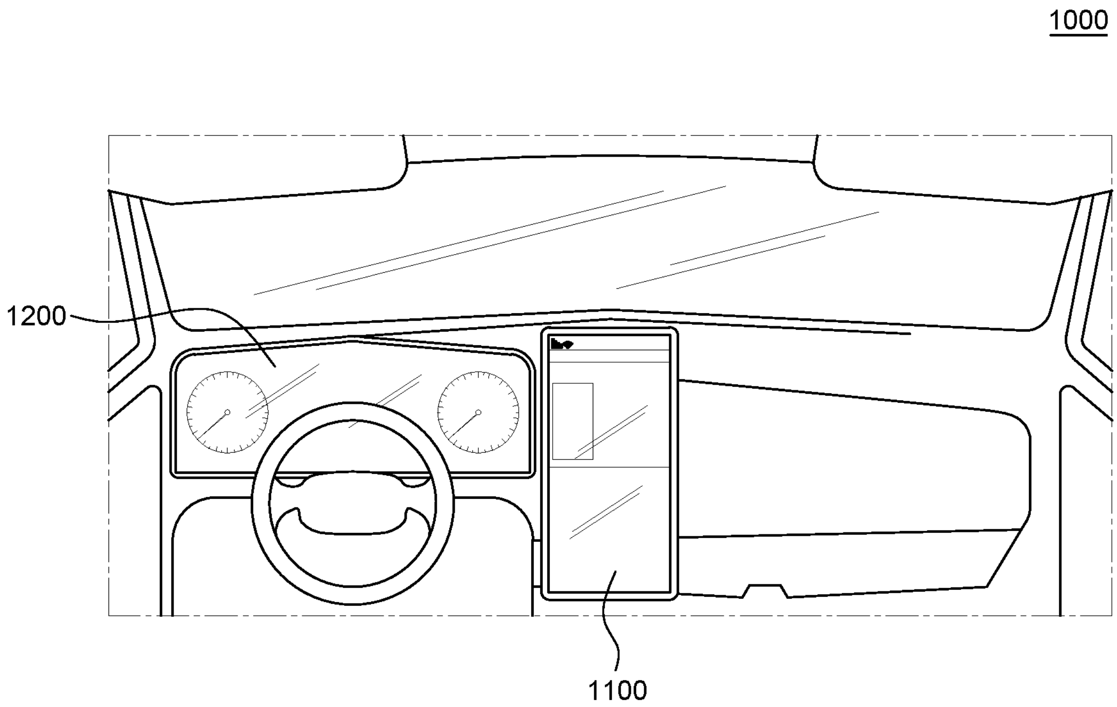
FIG. 8 is a view for explaining an example in which the display device can be used.

FIG. 8 is a view for explaining an example in which the display device can be used. Referring to FIG. 5, the liquid crystal display device according to an exemplary embodiment of the present disclosure can be used for a dashboard 1100 or a navigation system 1200 of an automobile 1000. The liquid crystal display device 1000 according to an exemplary embodiment of the present disclosure includes an antistatic layer that satisfies a specific sheet resistance, light transmittance, and reflectance, and can be implemented as an in-cell touch type liquid crystal display device usable in a vehicle display. Accordingly, since the number of displays used inside automobiles has recently increased and touch input on the display is necessarily required due to a decrease in the number of physical buttons thereof, the liquid crystal display device can be advantageously used for displays such as the automobile dashboard 1100 or navigation system 1200 that requires touch input inside the vehicles.

Hereinafter, the effects of the present disclosure will be described in more detail through Examples and Comparative Examples. However, the following examples are for illustrative purposes only, and the scope of the present disclosure is not limited by the following examples.

Experimental Example 2

Below, sheet resistance, light transmittance, and reflectance of antistatic layers that are applied to liquid crystal display devices according to the Comparative Examples and the Examples of the present disclosure were measured.

Examples 1 to 5 and Comparative Examples 1 to 4

Samples in which antistatic layers having a thickness of 200 Å were formed were manufactured by differing the contents of $In_2O_3$, $SnO_2$, and $SiO_2$. The contents of $In_2O_3$, $SnO_2$, and $SiO_2$ according to each of Examples and Comparative Examples are shown in Table 1. The sheet resistance, light transmittance, and reflectance of the samples manufactured according to Examples 1 to 5 and Comparative Examples 1 to 4 were measured and shown in Table 1.

TABLE 1

| | Contents | | | Measurement Results | | |
|---|---|---|---|---|---|---|
| Classification | $In_2O_3$ Content (wt. %) | $SnO_2$ Content (wt. %) | $SiO_2$ Content (wt. %) | Sheet Resistance (Log value) | Light Transmittance (%) | Reflectance (%) |
| Example 1 | 84 | 5 | 11 | 6.3 | 96.8 | 10.3 |
| Example 2 | 83.5 | 5 | 11.5 | 6.5 | 96.5 | 10.6 |
| Example 3 | 83 | 5 | 12 | 7.0 | 96.7 | 10.9 |
| Example 4 | 79 | 10 | 11 | 6.3 | 97.3 | 10.7 |
| Example 5 | 80 | 10 | 10 | 6.3 | 97.3 | 11.0 |
| Comparative Example 1 | 31 | 60 | 9 | 7.7 | 96.0 | 11 |
| Comparative Example 2 | 81 | 5 | 14 | 7.8 | 96.5 | 10.5 |
| Comparative Example 3 | 80.5 | 10 | 9.5 | 5.8 | 97.0 | 10.8 |
| Comparative Example 4 | 82 | 5 | 13 | 8.0 | 96.7 | 10.9 |

As can be seen in Table 1, when the contents of $In_2O_3$, $SnO_2$, and $SiO_2$ satisfy 78 wt. % to 85 wt. %, 5 wt. % to 10 wt. %, and 10 wt. % to 12 wt. %, respectively, antistatic layers in which a sheet resistance of $1\times10^{6.3}$ to $1\times10^{7.3}$ Ω/sq, a light transmittance of 96.5% or more, and a reflectance of 11% or less can be formed. When the contents are outside the above-mentioned ranges, it can be confirmed that there is a difficulty of obtaining a desired sheet resistance value. Through this, an in-cell touch type liquid crystal display device usable in a vehicle display can be manufactured.

Experimental Example 3

Figure 7A:
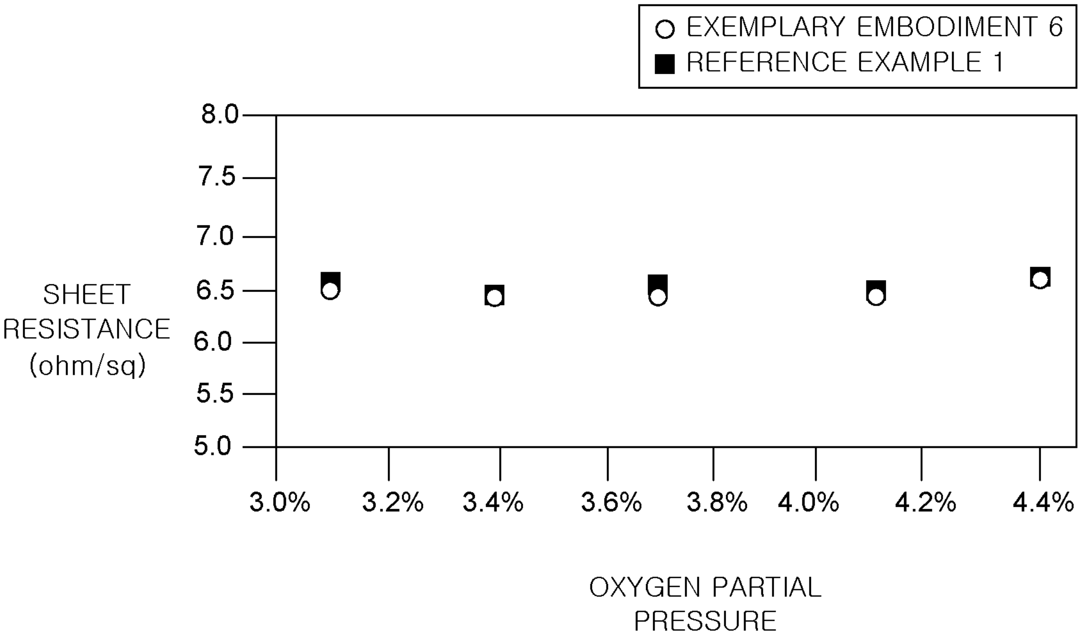
FIG. 7A is a graph showing changes in sheet resistance according to oxygen partial pressures in Examples 1, 6, and 7 of the present disclosure.
Figure 7B:
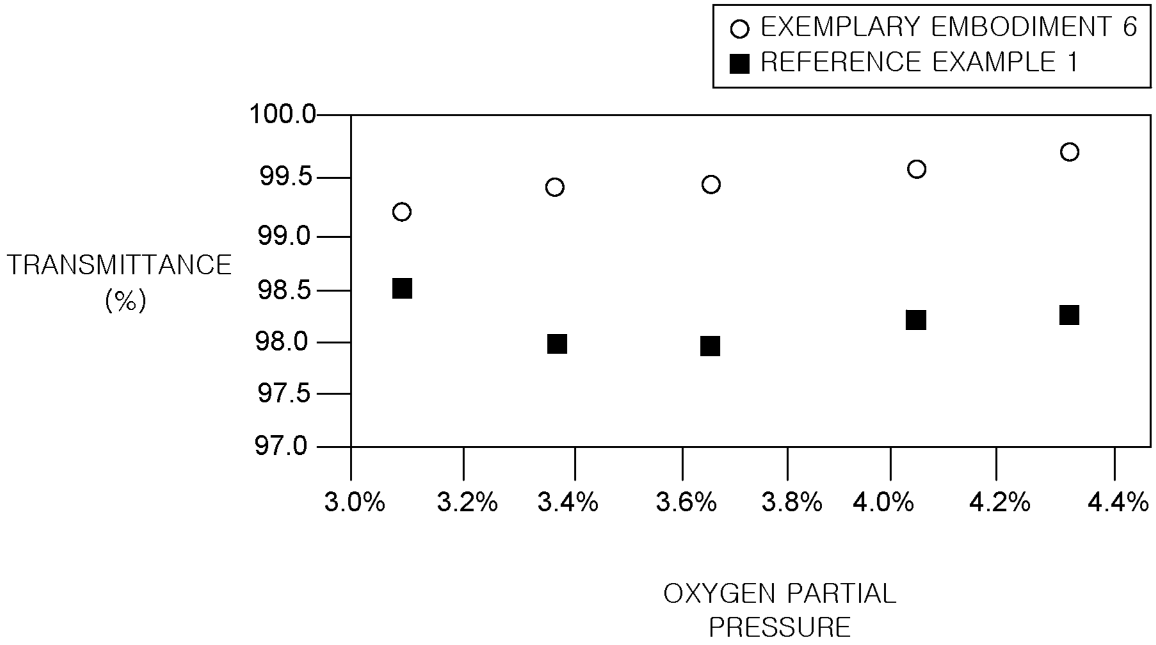
FIG. 7B is a graph showing changes in light transmittance according to oxygen partial pressures in Examples 1, 6, and 7 of the present disclosure.
Figure 7C:
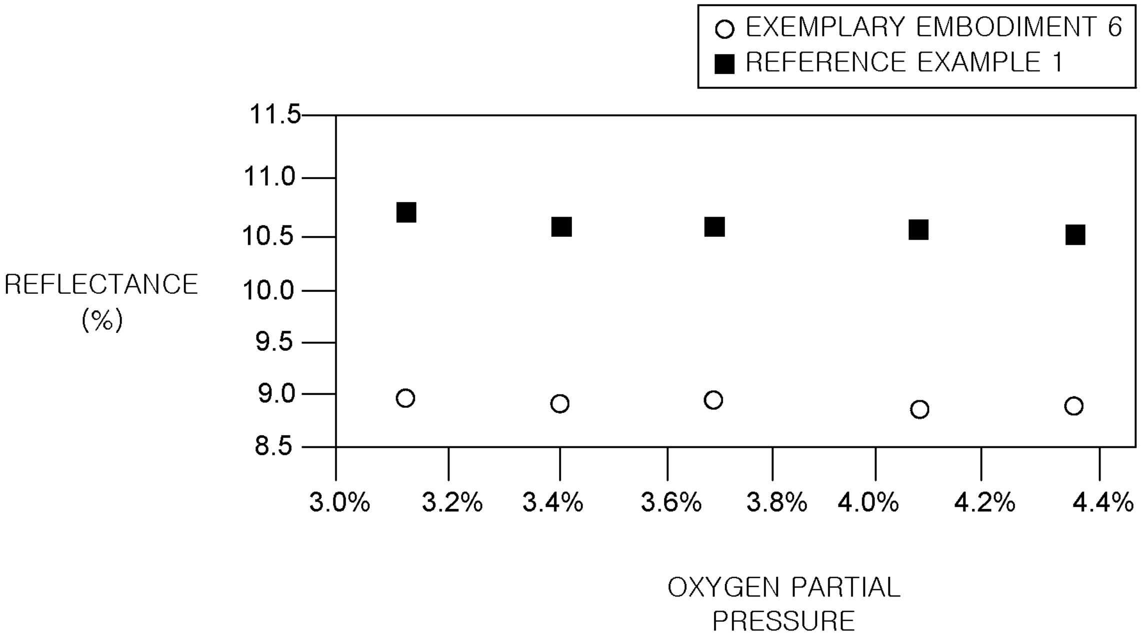
FIG. 7C is a graph showing changes in reflectance according to oxygen partial pressures in Examples 1, 6, and 7 of the present disclosure.

Below, sheet resistance, light transmittance, and reflectance of samples to which refractive index-matching layers and antistatic layers are applied, as in the liquid crystal display panel shown in FIG. 6 of the present disclosure, were measured. At this time, the refractive index-matching layer and the antistatic layer were formed through a sputtering process, and the sheet resistance, light transmittance, and reflectance were measured while adjusting an oxygen partial pressure at a power of 7 kW. Consequent results are shown in FIGS. 7A to 7C. FIGS. 7A to 7C are graphs showing changes in sheet resistance, light transmittance, and reflectance according to oxygen partial pressures of Example 6 and Reference Example 1.

Example 6

First, a first refractive index-matching layer having a thickness of 700 Å, which is formed of $SiO_2$ was formed on a glass substrate, and then, a second refractive index-matching layer having a thickness of 100 Å, which is formed of $Nb_2O_5$ was formed on the first refractive index-matching layer. Thereafter, a sample in which an antistatic layer having a thickness of 170 Å and formed from 83.5 wt. %, 5 wt. %, and 11.5 wt. % of $In_2O_3$, $SnO_2$, and $SiO_2$, respectively is formed on the second refractive index-matching layer, was manufactured.

Reference Example 1

A sample in which an antistatic layer having a thickness of 170 Å and formed from 83.5 wt. %, 5 wt. %, and 11.5 wt. % of $In_2O_3$, $SnO_2$, and $SiO_2$, respectively, is formed on a glass substrate without the first refractive index-matching layer and the second refractive index-matching layer, compared to Example 6, was manufactured.

First, referring to FIG. 7A, compared to Manufacture Example 1 in which only the antistatic layer was formed, it can be confirmed that Example 6 in which the first refractive index-matching layer and the second refractive index-matching layer were disposed between the glass substrate and the antistatic layer had the same level of sheet resistance value. That is, even when the refractive index-matching layer is additionally disposed, there is a little change in sheet resistance value, so static electricity can be easily discharged to the outside without degradation in touch performance by using the antistatic layer.

Next, referring to FIGS. 7B and 7C, it can be confirmed that light transmittance is significantly improved and external light reflectance decreases in Example 6 in which the first refractive index-matching layer and the second refractive index-matching layer are disposed between the glass substrate and the antistatic layer.

Therefore, the liquid crystal display device according to an exemplary embodiment of the present disclosure can implement an antistatic function capable of preventing electrostatic interference while having excellent transmittance and low reflectance through the antistatic layer.

Experimental Example 4

Below, reflectance and color coordinate values were measured when an advanced true wide (ATW) polarizing plate (Nitto corporation) was disposed on Example 6 and a sample to which the refractive index-matching layer and the antistatic layer were applied. At this time, a sample including a conventionally used antistatic layer was measured as Comparative Example 5. Reflectance (Y(D65)) and color coordinates (a*, b*) of the samples manufactured according to Example 6 and Comparative Example 5 were measured using a light source of 6500K and are shown in Table 2.

TABLE 2

| | Y*(D65) | a*(D65) | b*(D65) |
|---|---|---|---|
| Example 6 | 5.57 ± 0.04 | 0.69 ± 0.17 | −0.84 ± 0.30 |
| Comparative Example 5 | 5.61 ± 0.02 | 0.52 ± 0.16 | −0.30 ± 0.29 |

Referring to Table 2, it can be confirmed that the sample of Example 6 further including a polarizing plate had a reduction in reflectance compared to the sample including a conventional antistatic layer, and color coordinates were shifted to more bluish colors.

The exemplary embodiments of the present disclosure can also be described as follows:

According to an aspect of the present disclosure, there is provided a liquid crystal display device. The liquid crystal display device includes a first substrate including a plurality of thin film transistors; a second substrate disposed to face the first substrate and including a black matrix and a color filter; a touch electrode disposed on the first substrate or second substrate; and an antistatic layer disposed on the first substrate. The antistatic layer is formed from $In_2O_3$, $SnO_2$, and $SiO_2$.

A content of $In_2O_3$ may be 78 wt. % to 85 wt. %, a content of $SnO_2$ may be 5 wt. % to 10 wt. %, and a content of $SiO_2$ may be 10 wt. % to 12 wt. %.

The antistatic layer may include 30 at % to 35 at % of indium (In), 2 at % to 4 at % of tin (Sn), 8 at % to 11 at % of silicon (Si), and 50 at % to 60 at % of oxygen.

A sheet resistance of the antistatic layer may be $1\times10^{6.3}$ to $1\times10^{7.3}$ Ω/sq.

A light transmittance of the antistatic layer may be 97.5% or more and a reflectance of the antistatic layer may be 10.5% or less.

The antistatic layer may have a thickness of 100 Å to 250 Å.

The liquid crystal display device may further comprise a polarizing plate disposed on the antistatic layer and a cover window disposed on the polarizing plate.

The liquid crystal display device may further comprise at least one insulating layer disposed on the thin film transistor; a pixel electrode disposed on the insulating layer and electrically connected to the thin film transistor; and a common electrode spaced apart from the pixel electrode. The pixel electrode may be disposed on the same layer as the common electrode.

The liquid crystal display device may further comprise a refractive index-matching layer disposed between the second substrate and the antistatic layer and including $SiO_2$.

The refractive index-matching layer may be formed of a single layer including $SiO_2$, and the refractive index-matching layer may have a thickness of 100 Å to 900 Å.

The refractive index-matching layer may include a first refractive index-matching layer disposed on the second substrate and including $SiO_2$; and a second refractive index-matching layer disposed on the first refractive index-matching layer and including $Nb_2O_5$.

A thickness of the first refractive index-matching layer may be 600 Å to 900 Å, and a thickness of the second refractive index-matching layer may be 100 Å to 200 Å

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A liquid crystal display device comprising:

a first substrate;

a plurality of thin film transistors on the first substrate;

a second substrate that overlaps the first substrate and is spaced apart from the first substrate, the second substrate including a first side and a second side that is opposite the first side;

a black matrix and a color filter on the second side of the second substrate;

a touch electrode on the first substrate or second substrate; and an antistatic layer on the first side of the second substrate, the antistatic layer comprising $In_2O_3$, $SnO_2$, and $SiO_2$; and a refractive index-matching layer between the second substrate and the antistatic layer, the refractive index-matching layer including $SiO_2$, wherein a content of the $In_2O_3$ in the antistatic layer is in a range of 78 wt. % to 85 wt. %, a content of the $SnO_2$ in the antistatic layer is in a range of 5 wt. % to 10 wt. %, and a content of the $SiO_2$ in the antistatic layer is in a range of 10 wt. % to 12 wt. %, wherein a sheet resistance of the antistatic layer is in a range of $1\times10^{6.3}$ to $1\times10^{7.3}$ Ω/sq, wherein the liquid crystal display device is included in a vehicle, wherein the refractive index-matching layer comprises a single layer that has $SiO_2$, and a thickness of the refractive index-matching layer is in a range of 100 Å to 900 Å, wherein the single layer of the refractive index-matching layer includes a first surface that is in direct contact with the antistatic layer and a second surface that is opposite the first surface and in direct contact with the first side of the second substrate, and wherein the second substrate is larger than the first substrate.

2. The liquid crystal display device of claim 1, wherein the antistatic layer includes 30 atomic % to 35 atomic % of indium, 2 atomic % to 4 atomic % of tin, 8 atomic % to 11 atomic % of silicon, and 50 atomic % to 60 atomic % of oxygen.

3. The liquid crystal display device of claim 1, wherein a light transmittance of the antistatic layer is at least 97.5% and a reflectance of the antistatic layer is less than or equal to 10.5%.

4. The liquid crystal display device of claim 1, wherein a thickness of the antistatic layer is in a range of 100 Å to 250 Å.

5. The liquid crystal display device of claim 1, further comprising:

a polarizing plate on the antistatic layer; and a cover window on the polarizing plate.

6. The liquid crystal display device of claim 1, further comprising:

at least one insulating layer on the plurality of thin film transistors;

a pixel electrode on the at least one insulating layer, the pixel electrode electrically connected to a thin film transistor from the plurality of thin film transistors; and wherein the touch electrode is spaced apart from the pixel electrode and is configured for touch sensing during a touch sensing mode and is configured as a common electrode for displaying an image during a display mode.

7. A touch display device comprising:

a liquid crystal display panel configured to display an image, the liquid crystal display panel including a touch electrode, a substrate over the touch electrode, and a first substrate, the first substrate spaced apart from the substrate; and an antistatic layer on an upper surface of the liquid crystal display panel, the antistatic layer comprising $In_2O_3$, $SnO_2$, and $SiO_2$; and a refractive index-matching layer between the liquid crystal display panel and the antistatic layer, the refractive index-matching layer including $SiO_2$, wherein a content of the $In_2O_3$ in the antistatic layer is in a range of 78 wt. % to 85 wt. %, a content of the $SnO_2$ in the antistatic layer is in a range of 5 wt. % to 10 wt. %, and a content of the $SiO_2$ in the antistatic layer is in a range of 10 wt. % to 12 wt. %, wherein a sheet resistance of the antistatic layer is in a range of $1\times10^{6.3}$ to $1\times10^{7.3}$ Ω/sq, wherein the touch display device is included in a vehicle, wherein the refractive index-matching layer comprises a single layer that has $SiO_2$, and a thickness of the refractive index-matching layer is in a range of 100 Å to 900 Å, wherein the single layer of the refractive index-matching layer includes a first surface that is in direct contact with the antistatic layer and a second surface that is opposite the first surface and in direct contact with the substrate, and wherein the substrate is larger than the first substrate.

8. The touch display device of claim 7, wherein the liquid crystal display panel further comprises:

a plurality of thin film transistors on the first substrate;

a planarization layer on the plurality of thin film transistors, wherein the touch electrode is on the planarization layer;

a pixel electrode that is spaced part from the touch electrode and overlapping the touch electrode;

a liquid crystal layer on the pixel electrode;

a black matrix and a color filter on a lower surface of the substrate, the black matrix and the color filter being between the liquid crystal layer and the substrate.

9. The touch display device of claim 8, wherein the touch electrode is configured for touch sensing during a touch sensing mode and is configured as a common electrode for displaying an image during a display mode.

* * * * *